US012627039B2

(12) United States Patent
Zweers

(10) Patent No.: US 12,627,039 B2
(45) Date of Patent: May 12, 2026

(54) EDGE-ENABLED VOID ISOLATOR (EEVI) FOR ANTENNAS

(71) Applicant: Qorvo US, Inc., Greensboro, NC (US)

(72) Inventor: Jan-Willem Zweers, Nieuwleusen (NL)

(73) Assignee: Qorvo US, Inc., Greensboro, NC (US)

( * ) Notice: Subject to any disclaimer, the term of this patent is extended or adjusted under 35 U.S.C. 154(b) by 201 days.

(21) Appl. No.: 18/273,528

(22) PCT Filed: Feb. 18, 2022

(86) PCT No.: PCT/US2022/070723
§ 371 (c)(1),
(2) Date: Jul. 20, 2023

(87) PCT Pub. No.: WO2022/183169
PCT Pub. Date: Sep. 1, 2022

(65) Prior Publication Data

US 2024/0120648 A1 Apr. 11, 2024

Related U.S. Application Data

(60) Provisional application No. 63/154,433, filed on Feb. 26, 2021.

(51) Int. Cl.
*H01Q 1/52* (2006.01)
*H01Q 21/28* (2006.01)

(52) U.S. Cl.
CPC ............ *H01Q 1/521* (2013.01); *H01Q 21/28* (2013.01)

(58) Field of Classification Search
USPC ........................................................ 343/721
See application file for complete search history.

(56) References Cited

U.S. PATENT DOCUMENTS

| | | | |
|---|---|---|---|
| 9,559,407 | B2 | 1/2017 | Van Dijk et al. |
| 10,587,846 | B1 | 3/2020 | Berg et al. |

(Continued)

FOREIGN PATENT DOCUMENTS

| | | | |
|---|---|---|---|
| CN | 211625172 U | 10/2020 | |
| EP | 824764 B1 * | 6/2001 | .......... B60Q 1/0023 |

(Continued)

OTHER PUBLICATIONS

Kang, D.-G. et al., "MIMO Antenna with High Isolation for WBAN Applications," International Journal of Antennas and Propagation, vol. 2015, Article ID 370763, Jul. 2015, Hindawi Publishing Corporation, 7 pages.

(Continued)

*Primary Examiner* — Dimary S Lopez Cruz
*Assistant Examiner* — Brandon Sean Woods
(74) *Attorney, Agent, or Firm* — Withrow & Terranova, P.L.L.C.

(57) ABSTRACT

An edge enabled void isolator (EEVI) for antennas is provided. In particular, two or more antennas are separated from one another by respective EEVI to provide isolation between the antennas. This isolation allows the antennas to be placed in close proximity, keeping the footprint of the antenna system relatively small for ease of use in small wireless devices. While two monopole antennas are specifically contemplated, the disclosure may be extended to more than two antennas and these antennas may be monopole, dipole, F, or the like.

20 Claims, 16 Drawing Sheets

(56) References Cited

U.S. PATENT DOCUMENTS

| | | | | |
|---|---|---|---|---|
| 11,063,350 | B2 | 7/2021 | Zweers | |
| 2007/0152881 | A1 | 7/2007 | Chan | |
| 2009/0256757 | A1 | 10/2009 | Chiang et al. | |
| 2012/0112852 | A1 * | 5/2012 | Manssen | H04B 17/12 333/112 |
| 2013/0293425 | A1 | 11/2013 | Zhu et al. | |
| 2016/0072176 | A1 | 3/2016 | Van Dijk et al. | |
| 2016/0285160 | A1 * | 9/2016 | Tatomirescu | H01Q 1/38 |
| 2016/0293425 | A1 * | 10/2016 | Sawada | H01L 21/2225 |
| 2018/0090826 | A1 * | 3/2018 | Da Costa Bras Lima | H01Q 9/04 |
| 2019/0305423 | A1 * | 10/2019 | Hussain | H01Q 5/10 |
| 2020/0112089 | A1 | 4/2020 | Zweers | |
| 2021/0280967 | A1 | 9/2021 | Wu et al. | |
| 2023/0283698 | A1 | 9/2023 | Wang et al. | |

FOREIGN PATENT DOCUMENTS

| | | | | | |
|---|---|---|---|---|---|
| EP | 2826098 | A1 | | 1/2015 | |
| EP | 2826098 | B1 | * | 11/2019 | H01Q 1/2275 |
| EP | 3852192 | A1 | | 7/2021 | |
| KR | 20180051056 | A | * | 5/2018 | G09F 3/208 |
| WO | 2022183195 | A1 | | 9/2022 | |

OTHER PUBLICATIONS

International Search Report and Written Opinion for International Patent Application No. PCT/US2022/070806, mailed Jun. 9, 2022, 19 pages.

International Search Report and Written Opinion for International Patent Application No. PCT/US2022/070723, mailed May 24, 2022, 14 pages.

* cited by examiner

EDGE-ENABLED VOID ISOLATOR (EEVI) FOR ANTENNAS

RELATED APPLICATIONS

This application is a 35 USC 371 national phase filing of International Application No. PCT/US2022/070723, which claims the benefit of U.S. provisional patent application Ser. No. 63/154,433, filed Feb. 26, 2021, the disclosures of which are incorporated herein by reference in their entireties.

FIELD OF THE DISCLOSURE

The technology of the disclosure relates generally to a radio frequency (RF) antenna.

BACKGROUND

Wireless devices have become increasingly common in current society. The prevalence of these wireless devices is driven in part by the many functions that are now enabled on such devices. Increased processing capabilities in such devices means that wireless devices have evolved from being pure communication tools into sophisticated multimedia centers that can interact with a variety of connected devices in such wireless environments as the Internet-of-Things (IoT).

As capabilities of the wireless devices increase, so does the number of active and/or passive components in the wireless devices. Contrary to increased component count and integration complexity, form factors for the wireless devices have become more and more compact. As a result, real estate inside the form factor becomes increasingly scarce.

A wireless device may include a number of antennas to provide receive diversity and/or enable such advanced transmit mechanisms as multiple-input, multiple-output (MIMO) and beamforming. Notably, an antenna typically requires sufficient spatial separation from other active/passive components in the wireless device so as to radiate effectively an electromagnetic wave(s). As such, it may be desirable to provide as many antennas as needed in the wireless device, without having to increase the footprint of the wireless device.

SUMMARY

Aspects disclosed in the detailed description include an edge-enabled void isolator (EEVI) for antennas. In a particular exemplary aspect, antennas are separated by an EEVI to provide isolation between the antennas. This isolation allows the antennas to be placed in close proximity, keeping the footprint of the antenna system relatively small for ease of use in small wireless devices. While two monopole antennas are specifically contemplated, the disclosure may be extended to more than two antennas and/or dipole antennas, and these antennas may be monopole, dipole, F, or the like.

In one aspect, an antenna system is disclosed. The antenna system comprises a conductive plane having a geometric perimeter. The conductive plane delimits an EEVI, wherein the EEVI extends from the geometric perimeter of the conductive plane toward a geometric center of the conductive plane. The antenna system also comprises a first antenna associated with the conductive plane and positioned to a first side of the EEVI along the geometric perimeter. The antenna system also comprises a second antenna associated with the conductive plane and positioned to a second side of the EEVI along the geometric perimeter.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
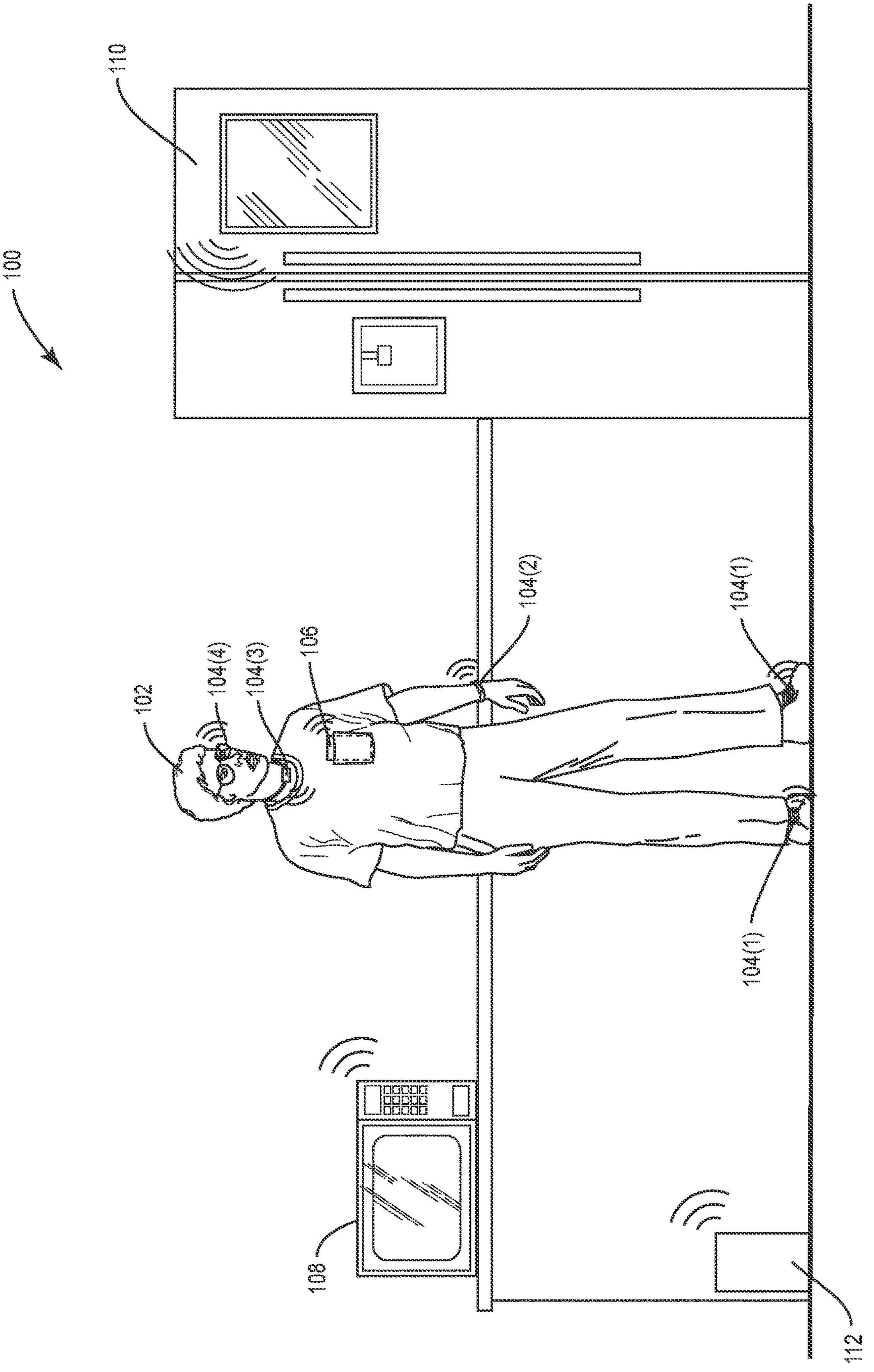
FIG. 1 is a stylized representation of a plurality of wireless devices that may fall under the heading of "Internet of Things" (IoT) in operation and communicating with one another or other remote devices.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It should further be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include an edge-enabled void isolator (EEVI) for antennas. In a particular exemplary aspect, antennas are separated by an EEVI to provide isolation between the antennas. This isolation allows the antennas to be placed in close proximity, keeping the footprint of the antenna system relatively small for ease of use in small wireless devices. While two monopole antennas are specifically contemplated, the disclosure may be extended to more than two antennas and/or dipole antennas, and these antennas may be monopole, dipole, F, or the like.

Figure 2A:
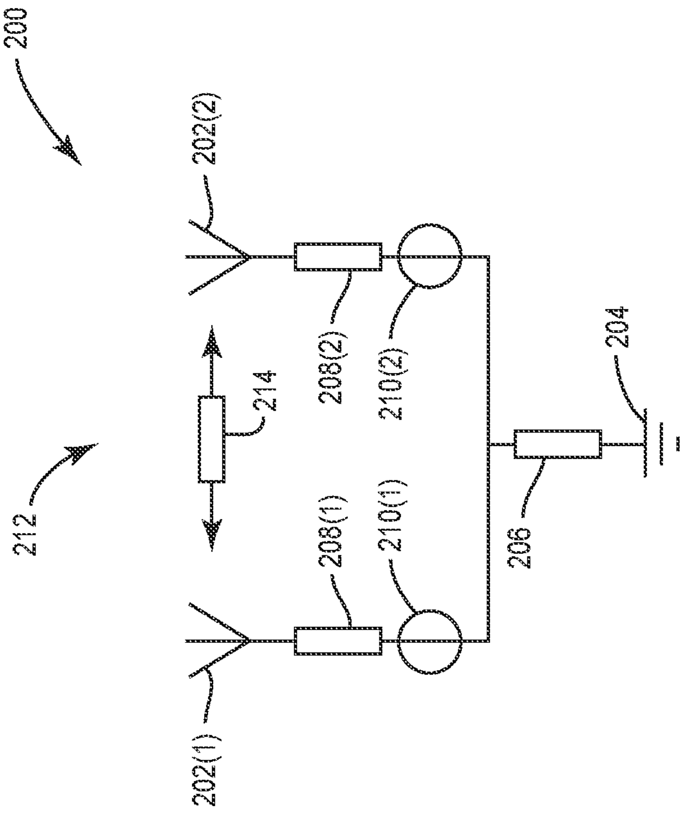
FIG. 2A shows an antenna system including two antennas for diversity reception.
Figure 2B:
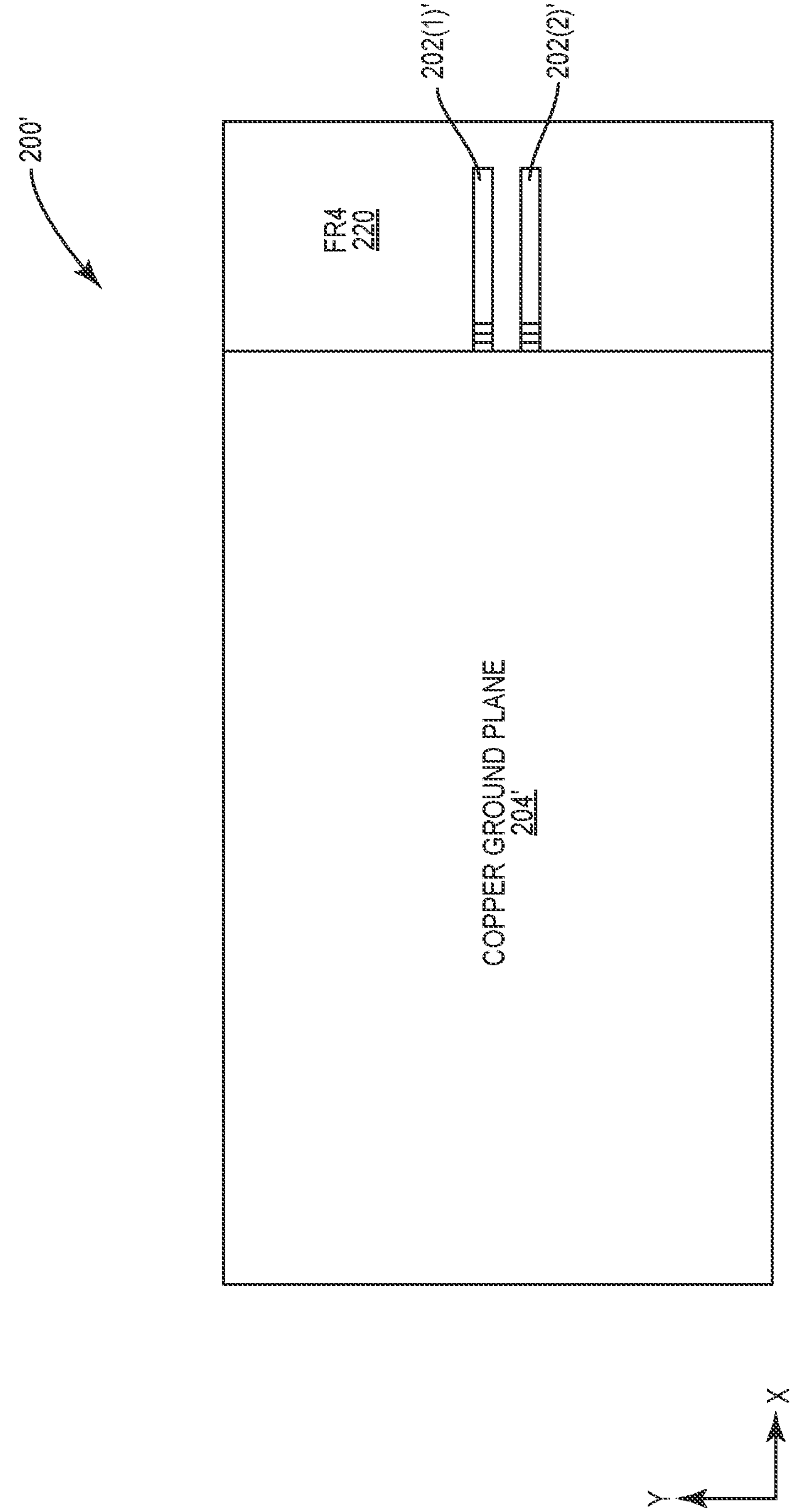
FIG. 2B is a top plan view of a conventional dual-antenna system corresponding to the antenna system of FIG. 2A.
Figure 2C:
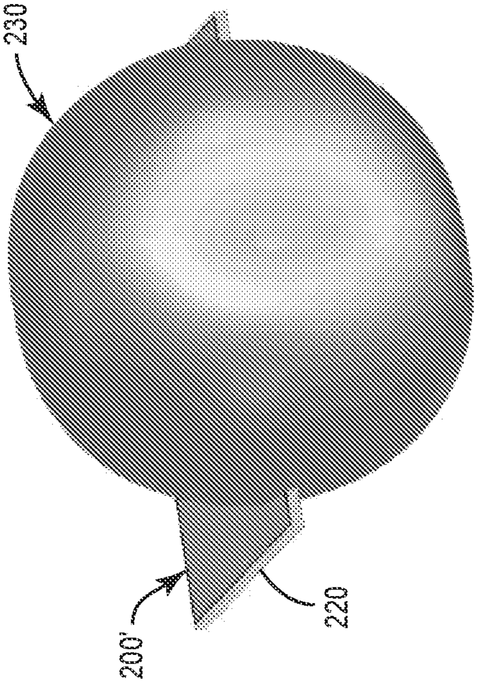
FIG. 2C is a side elevational view with an illustrative radiation field from the antenna system of FIG. 2B.
Figure 3:
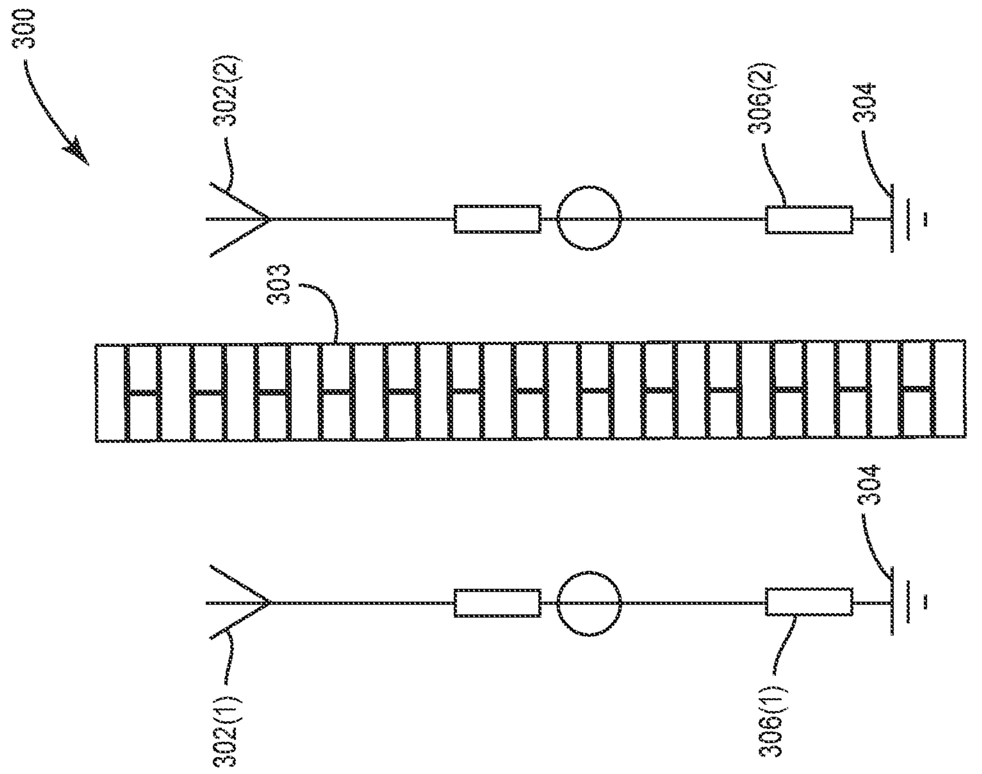
FIG. 3 is a stylized representation of a desired isolation characteristic that should exist between antennas to achieve desired diversity benefits.

Before addressing exemplary aspects of the present disclosure, an overview of the context and current limitations of multiple antenna systems is provided with reference to FIGS. 1-3. A discussion of exemplary aspects begins below with reference to FIG. 4.

In this regard, FIG. 1 illustrates an exemplary home environment 100 where a user 102 may be wearing multiple Internet of Things (IoT)-enabled devices 104(1)-104(4) along with a mobile phone 106. Further non-wearable IoT-enabled devices such as a microwave 108 and a refrigerator 110 may also be present in the home environment 100. The various IoT-enabled devices 104(1)-104(4), 108, 110 may communicate wirelessly with a hub or router 112, the mobile phone 106, each other, or other intermediate device to connect to broader communication networks such as the Internet. It should be appreciated that such wireless communication is enabled through transceiver circuitry and associated radiative elements such as an antenna.

IoT-enabled devices are typically small or devote relatively little room to circuitry to enable IoT-type functions. Accordingly, there is pressure to keep the transceiver circuitry and associated radiative elements as small as possible. This pressure may result in only a single antenna being used for any transceiver circuitry. While a single antenna may be sufficient in many instances, there is a large body of literature demonstrating the benefits of plural antennas to assist in promoting directional wireless communication, spatial diversity, or the like.

Unfortunately, plural antennas pose additional challenges when space is limited. FIG. 2A illustrates a simplified block diagram of an antenna system 200 that operates using two antennas 202(1)-202(2) on a shared "small" ground plane 204. There is an initial impedance 206 that is a complex common ground plane impedance. Each antenna 202(1)-202(2) has an associated radiation impedance 208(1)-208(2), which in many cases is fifty ohms (50Ω), between an input port 210(1)-210(2) and the ambient environment 212. Additionally, there is an isolation radiated impedance 214 that exists in the ambient environment 212 between the two antennas 202(1)-202(2). For good isolation between the antennas 202(1)-202(2), a system 200 needs less common ground plane impedance 206 and a high antenna-to-antenna impedance (isolation radiated impedance 214).

However, a typical system 200 implemented on a copper ground plane, such as system 200' illustrated in FIG. 2B does not provide such isolation. Using conventional values, a copper ground plane 204' may be placed on a substrate such as a printed circuit board (PCB) material (e.g., FR4) 220. Monopole antennas 202(1)'-202(2)' may be made from copper as well and also sit on the PCB material 220. Typical dimensions for the PCB material 220 are 130 millimeters (mm) in the x-direction by 60 mm in the y-direction. The copper ground plane 204' may be 100 mm in the x-direction and co-extensive with the PCB material 220 in the y-direction (e.g., 60 mm). The antennas 202(1)'-202(2)' may be 19.5 mm in the x-direction and separated in the y-direction by 3 mm. This arrangement gives approximately 3 decibels (dB) of isolation, which is generally insufficient. Thus, even though there are two monopole antennas 202(1)'-202(2)', as illustrated by radiation pattern 230 in FIG. 2C, the antennas 202(1)'-202(2)' act as a single monopole antenna. Such a radiation pattern does not exhibit any of the benefits of spatial diversity or the directional capabilities of two antennas.

Conceptually, total isolation would be achieved between the antennas in an antenna system 300 as illustrated in FIG. 3, where metaphorical isolation 303 provides directive near field cancelation between antennas 302(1)-302(2) and there is ground plane current cancelation within the ground plane 304 so that each antenna 302(1)-302(2) has its own ground plane impedance 306(1)-306(2).

Exemplary aspects of the present disclosure add an EEVI between antennas in a small form factor, thereby providing the desired isolation hypothesized in FIG. 3. In particular, an EEVI may be associated with a tunable capacitance and/or a tunable inductance (e.g., a varactor and a tunable inductor) to allow for tuning of the isolation and create a desired response. While well suited for use with monopole antennas, the present disclosure may also be applied to F-antennas, bowtie antennas, dipole antennas, and the like, and works well with offset dipole antennas.

More information about EEVI may be found in U.S. Pat. No. 11,063,350 authored by the current inventor, which is hereby incorporated by reference in its entirety. Saliently, the '350 patent describes an EEVI as a void that extends from the geometric perimeter of a conductive plane (e.g., a ground plane) toward a geometric center of the conductive plane. The void may take any number of shapes. The '350 patent primarily relied on rectilinear void shapes, but noted that other void shapes may be used. The '350 patent relied on two EEVIs to reflect electrical current generated by an associated sandwiched antenna back towards the antenna so as to form a dipole antenna. In contrast, exemplary aspects of the present disclosure use a single sandwiched EEVI to provide isolation between two sandwiching antennas.

Figure 4:
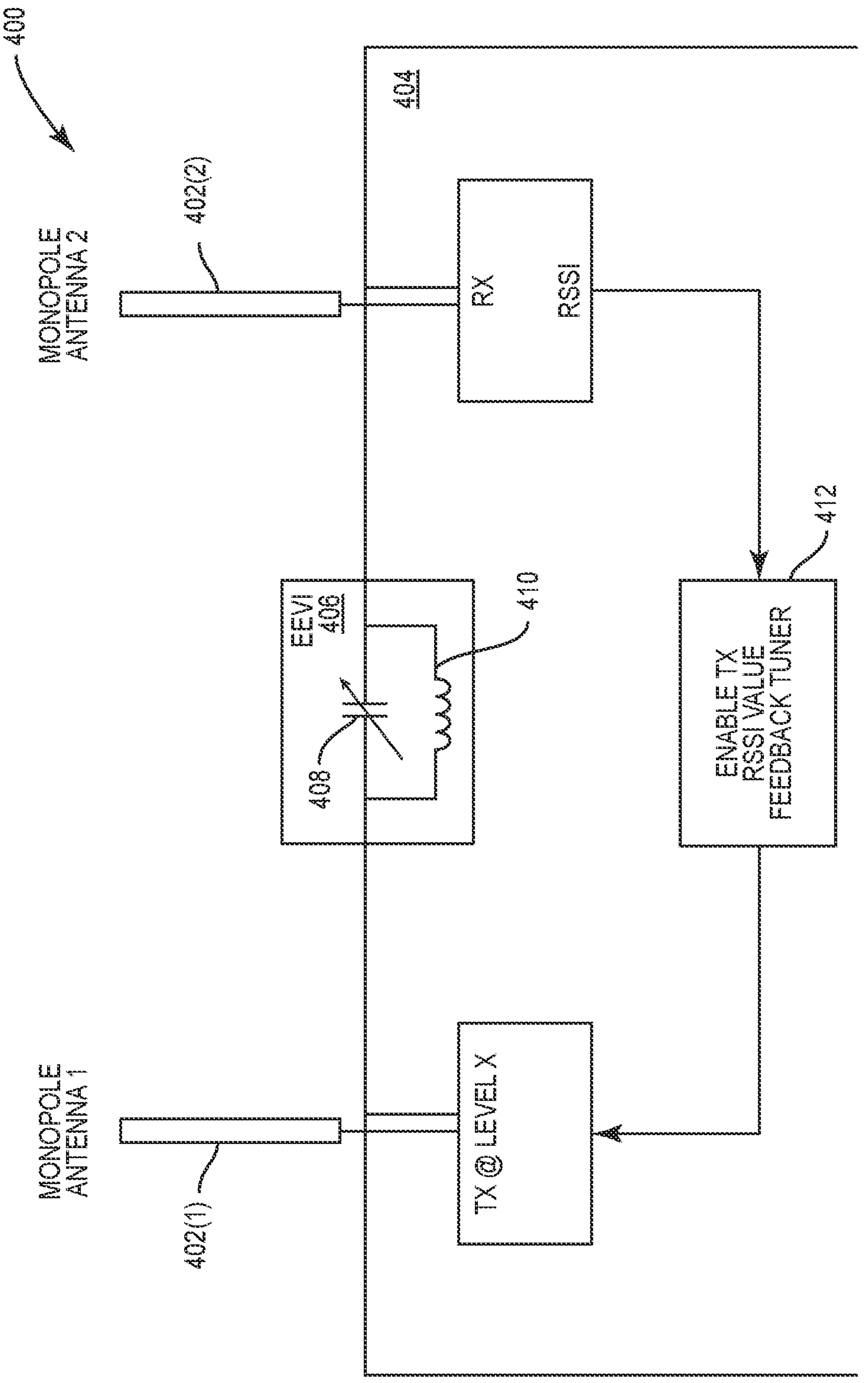
FIG. 4 illustrates a circuit diagram of a dual-antenna system with an edge-enabled void isolator (EEVI) positioned between two monopole antennas to provide the isolation illustrated in FIG. 3.

In this regard, FIG. 4 illustrates a circuit diagram of an antenna system 400 having two monopole antennas 402(1)-402(2) associated with a ground plane 404. More generically, the ground plane referenced herein may be referred to as a conductive plane because it is possible that material may be held at a voltage level other than true zero potential and/or transient voltage levels may also occur. An EEVI 406 with associated tuning circuitry formed from a variable capacitor 408 and an inductor 410 provides isolation between the monopole antennas 402(1)-402(2). In an exemplary aspect, the inductor 410 is a variable inductor. A feedback tuner circuit 412 may be used to control or tune the variable capacitor 408 and/or the inductor 410 (if the inductor 410 is variable). The feedback tuner circuit 412 may be physical circuitry. Using a received signal strength indicator (RSSI) between the antennas 402(1)-402(2), the feedback tuner circuit 412 may set a desired frequency response. For example, the monopole antenna 402(1) may transmit a signal at a known frequency and strength. Monopole antenna 402(2) may receive the signal and provide an RSSI measurement to the feedback tuner circuit 412 to allow setting of the variable capacitor 408. Alternatively, in place of the feedback tuner circuit 412, software may be used to enable the same control of the tuning circuitry.

Note that in an exemplary aspect, the desired frequency response may provide isolation at the transmission frequency. Alternatively, and sometimes more optimally, the desired frequency response may provide the greatest isolation at a frequency above the transmission frequency. Such positioning of the greatest isolation above the transmission frequency may provide more efficient power use.

Figure 5:
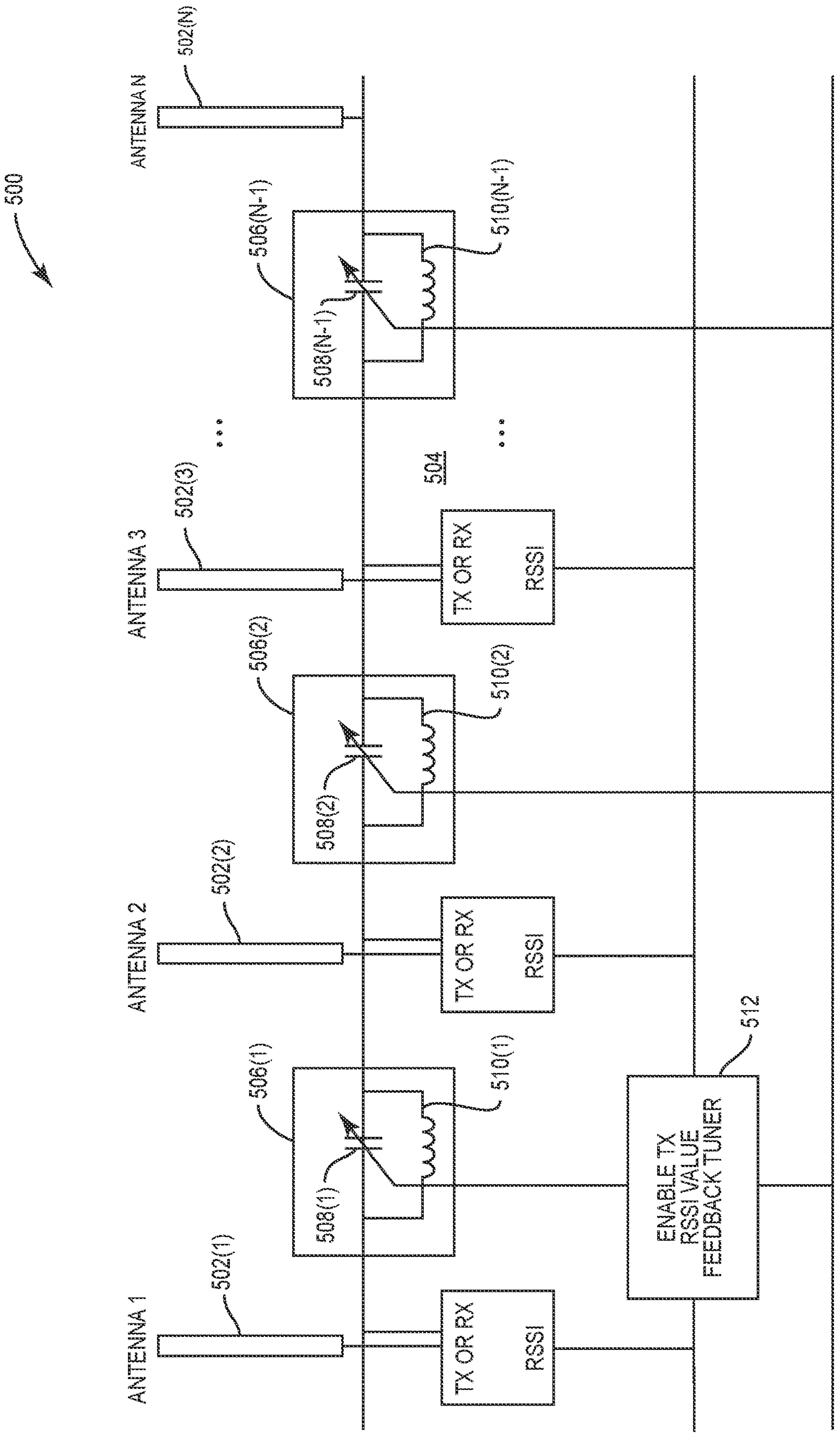
FIG. 5 illustrates a circuit diagram of a multiple-antenna system with respective EEVIs positioned between antennas.

The concept of using an EEVI to isolate antennas may be extended past two antennas as illustrated by an antenna system 500 in FIG. 5. The antenna system 500 includes antennas 502(1)-502(N) associated with a ground plane 504. EEVIs 506(1)-506(N−1) with associated tuning circuitry formed from variable capacitors 508(1)-508(N−1) and inductors 510(1)-510(N−1) provide isolation between the antennas 502(1)-502(N). A feedback tuner circuit 512 may be used in a fashion similar to the feedback tuner circuit 412 of FIG. 4, iterating through different combinations of antennas 502(1)-502(N) to tune the variable capacitors 508(1)-508(N−1).

Figure 6A:
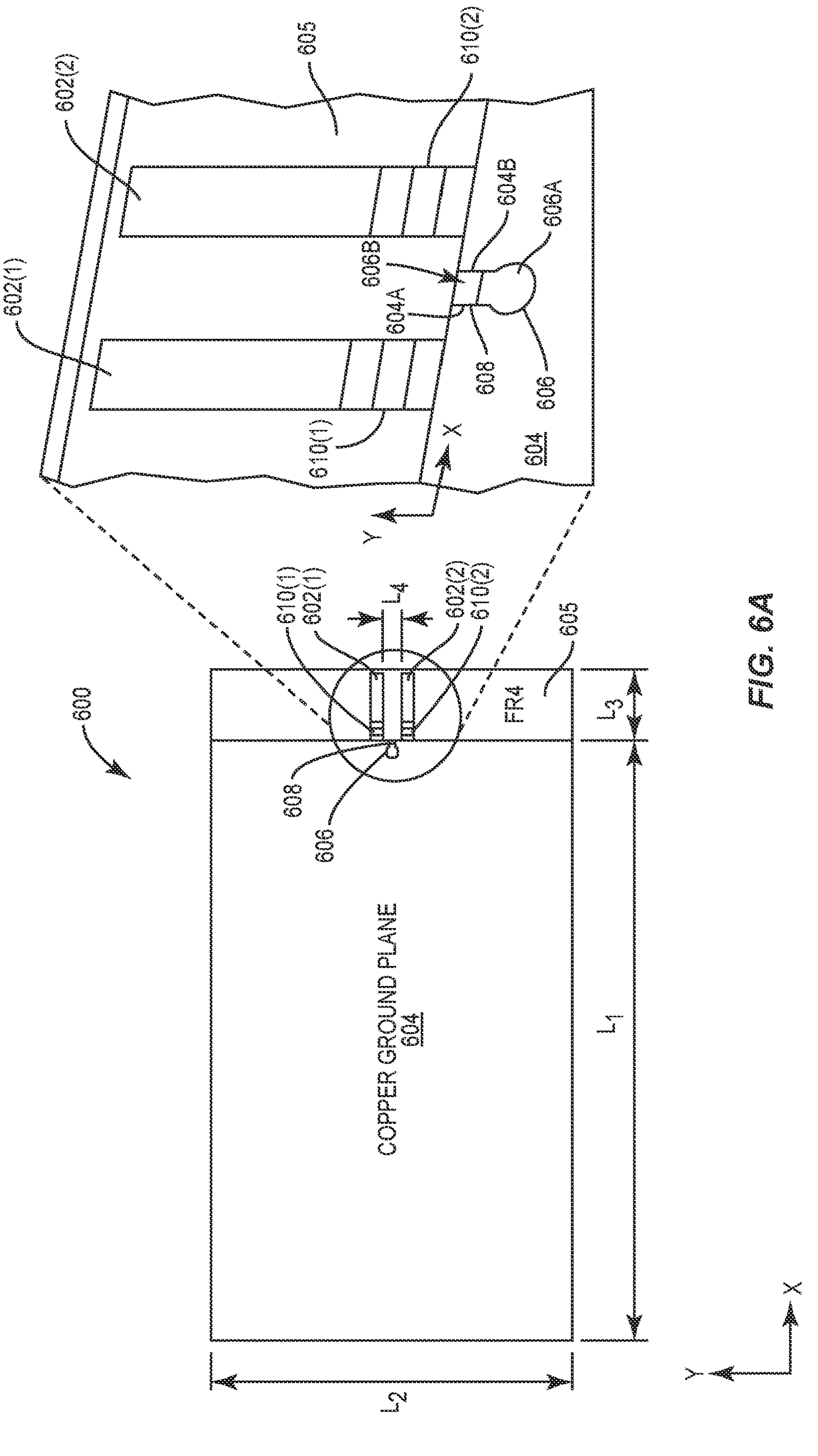
FIG. 6A is a top plan view of a dual-antenna system with an EEVI according to an exemplary aspect of the present disclosure.

FIG. 6A illustrates a top plan view of an antenna system 600 corresponding to the antenna system 400 of FIG. 4, with an enlarged partial view of a portion provided through the inset. Specifically, the antenna system 600 includes two monopole antennas 602(1)-602(2) with an associated ground pane 604, which may be a copper plate on a PCB material 605 such as FR4. An EEVI 606 may be positioned between the antennas 602(1)-602(2). The EEVI 606 may have an associated variable capacitor 608 that bridges edges 604A, 604B of the ground plane 604. The edges 604A, 604B also delimit a portion of the EEVI 606. Inductors 610(1)-610(2) may also be present in the antennas 602(1)-602(2), respectively. The ground plane 604 may have a dimension $L_1$ along the x-axis and a dimension $L_2$ along the y-axis. In an exemplary aspect, $L_1$ may be 100 mm and $L_2$ may be 60 mm. The PCB material 605 may have an additional exposed area, with a dimension $L_3$ along the x-axis, where $L_3$ may be 16.5 mm. The antennas 602(1)-602(2) may be spaced by a dimension $L_4$ along the y-axis. In an exemplary aspect, $L_4$ may be 3 mm. As noted, the shape of the EEVI 606 may be almost any shape, but as illustrated, the EEVI 606 is a generally circular shape or area 606A with a throat 606B bridged by the variable capacitor 608. While not illustrated, instead of a circular shape, the EEVI may be generally rectilinear. The diameter of the generally circular area 606A is less than the dimension $L_4$.

Despite the relatively close proximity of the antennas 602(1)-602(2), the isolation provided by the EEVI 606 allows for directionality and diversity in use of the antennas 602(1)-602(2) because the radiation patterns are greatly impacted by the isolation between the antennas 602(1)-602(2). The use of the isolation allows the radiation patterns to be sculpted to a desired shape.

Figure 6B:
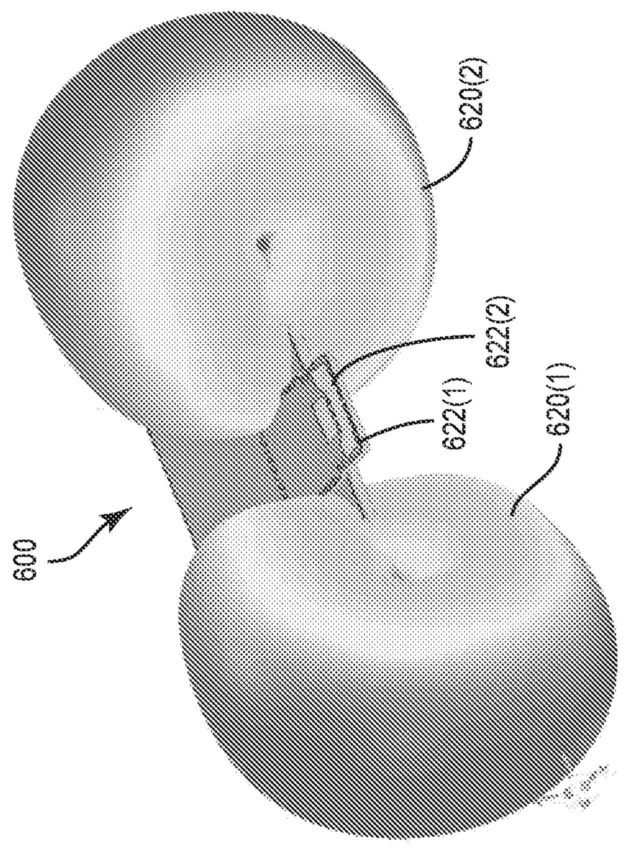
FIG. 6B is a side elevational view with an illustrative radiation field from the dual-antenna system that uses an EEVI.

That is, as seen in FIG. 6B, radiation patterns 620(1)-620(2) are formed from antennas 622(1)-622(2). As illustrated, the antennas 622(1)-622(2) do not identically correspond in shape to the antennas 602(1)-602(2) of FIG. 6A, but comparable radiation patterns could be formed from the antennas 602(1)-602(2). Thus, the designer is afforded at least two variables to help shape the radiation patterns (e.g., the shape and placement of the antennas as well as the isolation frequency). When compared to the radiation pattern 230 of FIG. 2C, it is readily apparent that the isolation provided by the EEVI 606 generates desired performance.

While there are myriad possible uses for antenna systems according to exemplary aspects of the present disclosure, a variety of non-limiting exemplary use cases are illustrated in FIGS. 7A-8C.

Figure 7A:
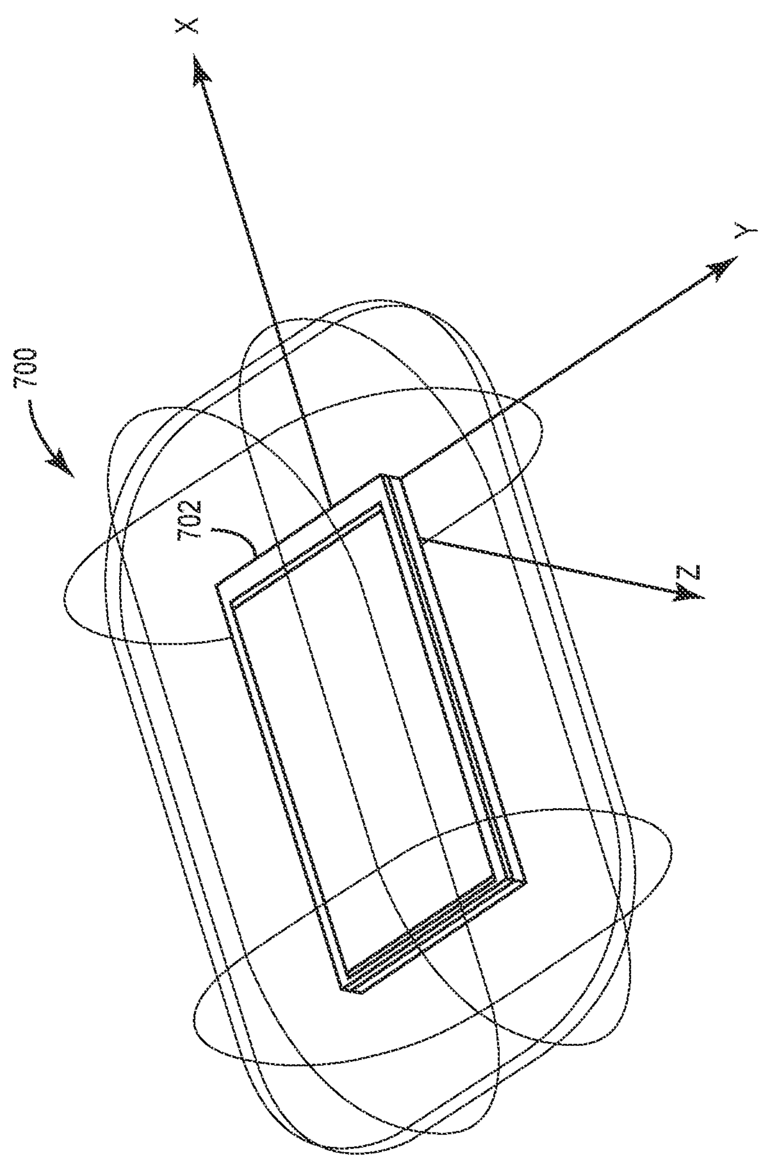
FIG. 7A illustrates a first use case where an antenna system according to exemplary aspects of the present disclosure is included in a shelf label.
Figure 7B:
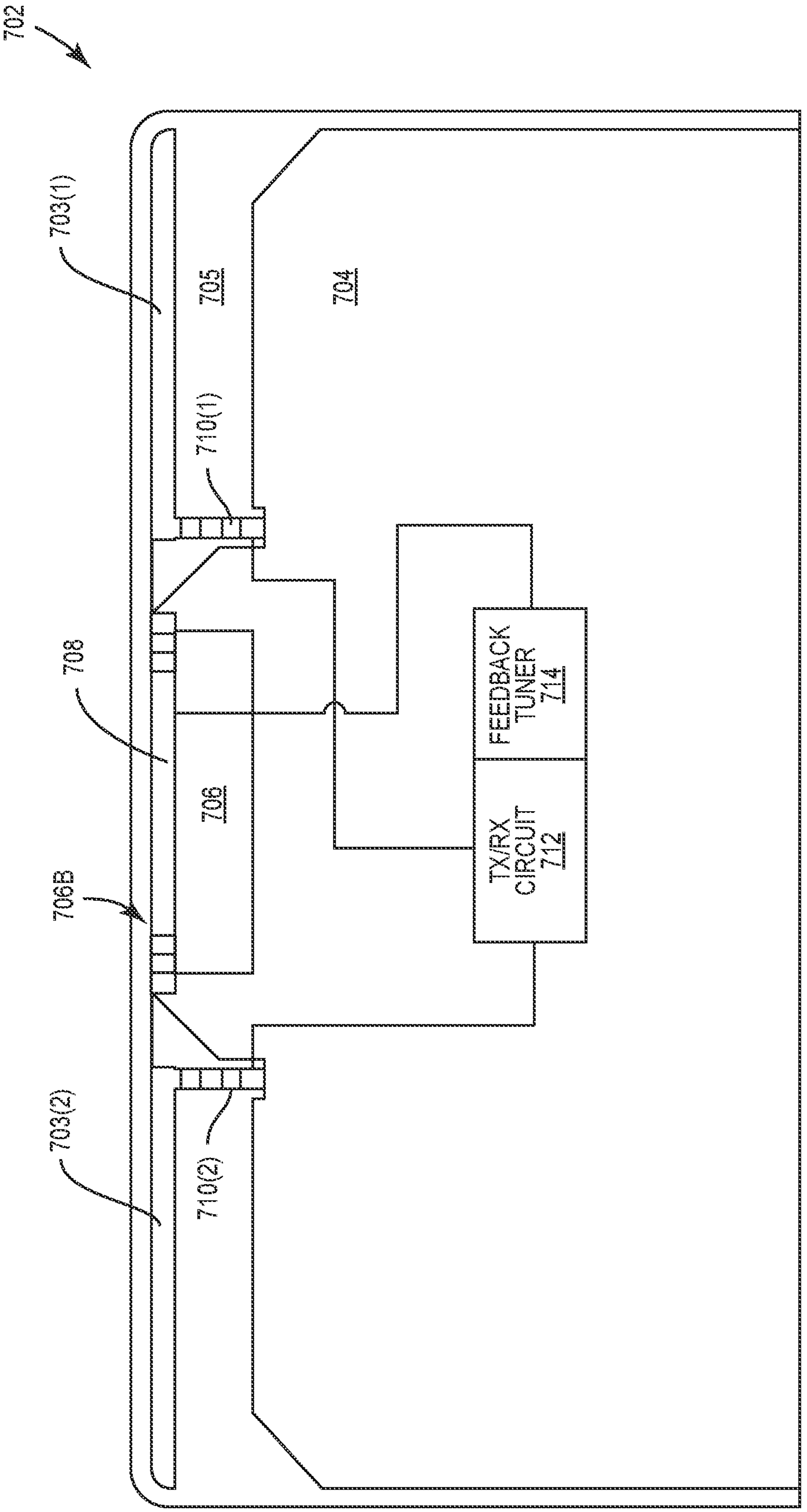
FIG. 7B is a top plan view of a dual-antenna system that may be used in the shelf label of FIG. 7A.
Figure 7C:
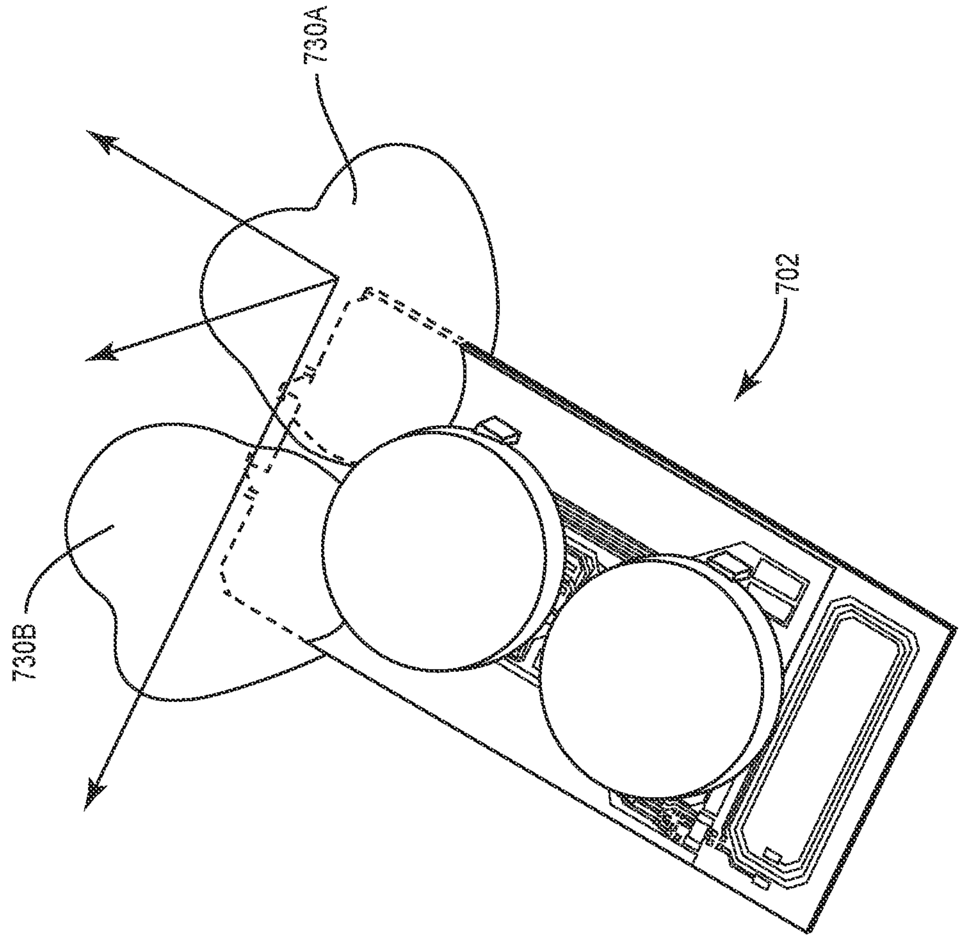
FIG. 7C illustrates a top perspective view with an illustrative radiation field from the dual-antenna system of FIG. 7B.

In this regard, FIGS. 7A-7C illustrate an electronic shelf label 700 with an antenna system 702 positioned therein. Specifically, as better illustrated in FIG. 7B, the antenna system 702 may include antennas 703(1)-703(2) with an associated ground plane 704 positioned on a PCB material

705. Void 706 forms the EEVI that isolates the antenna 703(1) from the antenna 703(2). Variable capacitor 708 may bridge the throat 706B of the void 706. Inductors 710(1)-710(2) may be serially coupled to the antennas 703(1)-703(2). As illustrated, the antennas 703(1)-703(2) may be L-shaped and mirror images of one another, although other shapes are possible. Transceiver circuitry 712 may be coupled to the antennas 703(1)-703(2), and a feedback tuner circuit 714 may be coupled to the variable capacitor 708. This arrangement provides radiation patterns 730A, 730B as illustrated in FIG. 7C showing that the antennas 703(1)-703(2) are isolated from one another having desired diversity and directionality.

Figure 8A:
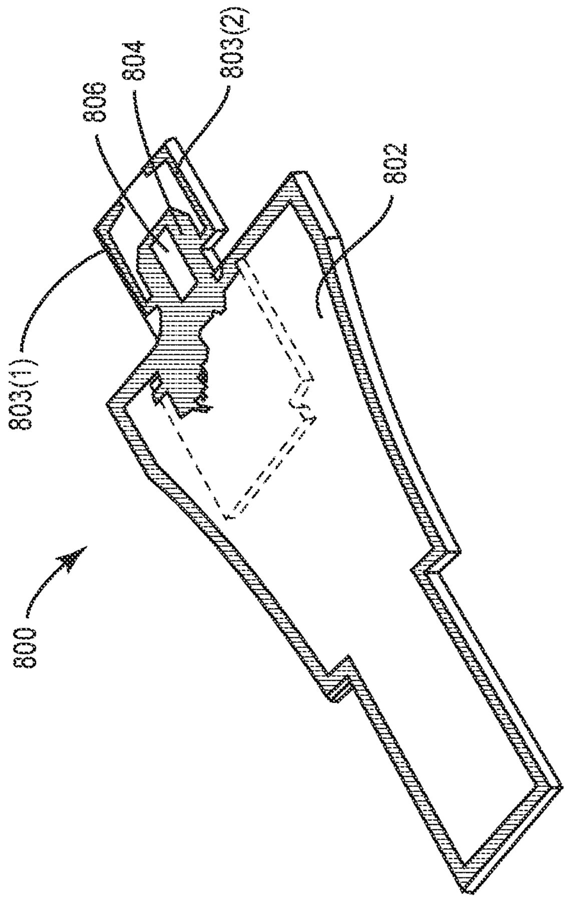
FIG. 8A is a top perspective view of a circuit board for a second use case where a two-antenna system with an EEVI in a first orientation is used in a light bulb.
Figure 8B:
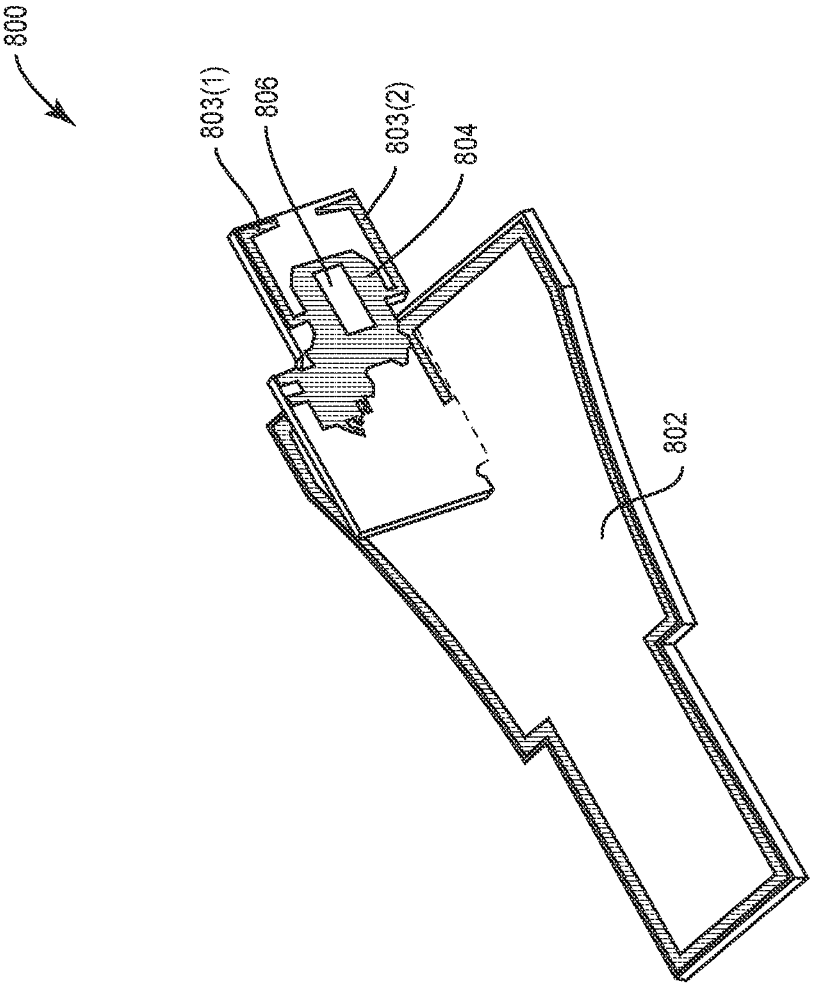
FIG. 8B is a top perspective view of a circuit board for a second use case where a two-antenna system with an EEVI in a second orientation is used in a light bulb.
Figure 8C:
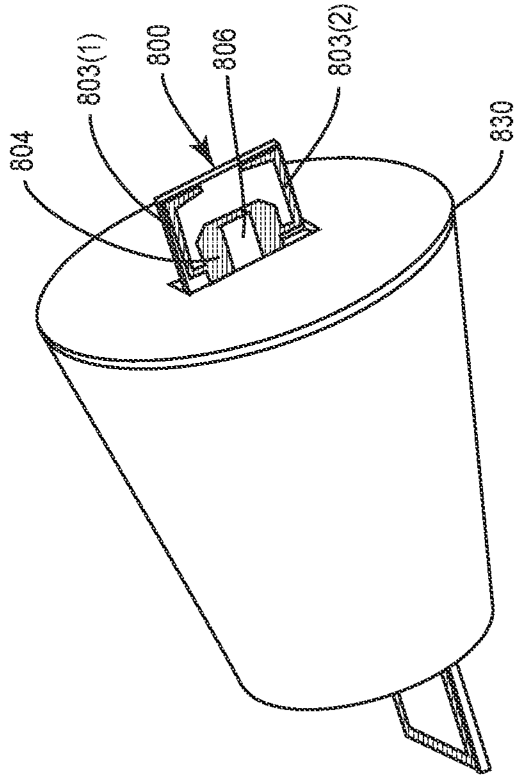
FIG. 8C shows the circuit board of FIG. 8A or 8B included in the base of the light bulb.

Another possible use case is a light bulb or more specifically a light emitting diode (LED) light bulb that may include an antenna system 800 positioned on an interior brace 802 for the light bulb. The antenna system 800 includes antennas 803(1)-803(2) with an associated ground plane 804 and EEVI 806. In FIG. 8A, the antennas 803(1)-803(2) are generally parallel with a plane defined by the brace 802. In contrast, in FIG. 8B, the antennas 803(1)-803(2) are in a plane perpendicular to the plane defined by the brace 802. In either event, the antenna system 800 may be placed in an LED-cooling cone 830 for incorporation into the light bulb as shown in FIG. 8C.

Figure 9:
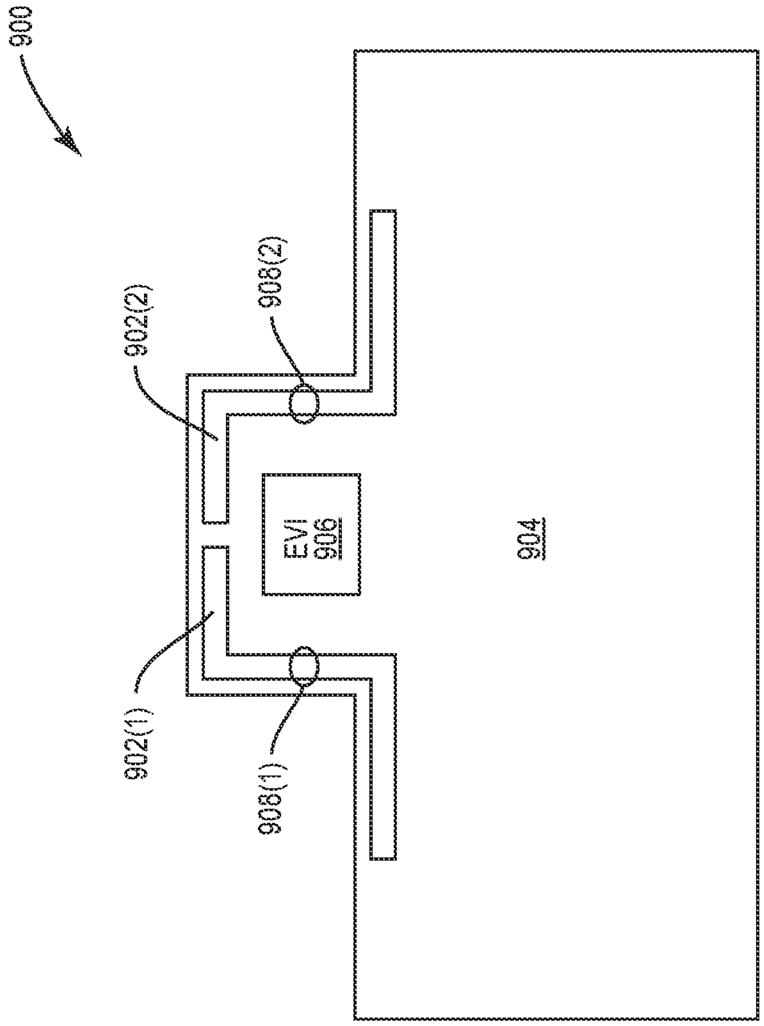
FIG. 9 shows a circuit board showing a dual dipole antenna system that uses an EEVI to provide isolation according to exemplary aspects of the present disclosure.

While the above discussion has focused on using monopole antennas, it should be appreciated that the present disclosure is not so limited, and dipole antennas may be used. Thus, as illustrated in FIG. 9, an antenna system 900 may include antennas 902(1)-902(2) which may be offset dipole antennas associated with a ground plane 904. An EEVI 906 may provide desired isolation. The antennas 902(1)-902(2) may be coupled to transceiver circuitry (not shown) at ports 908(1)-908(2). The length of the dipole may be modified as needed to optimize operation for a desired frequency. Likewise, the position of the ports 908(1)-908(2) may be moved along the length of the dipole as need or desired.

Those skilled in the art will recognize improvements and modifications to the preferred embodiments of the present disclosure. All such improvements and modifications are considered within the scope of the concepts disclosed herein and the claims that follow.

What is claimed is:

1. An antenna system comprising:
- a conductive plane having a geometric perimeter, the conductive plane delimiting an edge-enabled void isolator (EEVI), wherein the EEVI extends from the geometric perimeter of the conductive plane toward a geometric center of the conductive plane;
- a first antenna associated with the conductive plane and positioned to a first side of the EEVI along the geometric perimeter;
- a second antenna associated with the conductive plane and positioned to a second side of the EEVI along the geometric perimeter;
- a feedback tuner circuit; and

- tuning circuitry associated with the EEVI, wherein the tuning circuitry is coupled to the feedback tuner circuit and is configured to tune based on a signal from the feedback tuner circuit.

2. The antenna system of claim 1, wherein the tuning circuitry comprises a variable capacitor.

3. The antenna system of claim 2, further comprising a feedback tuner circuit coupled to the variable capacitor and configured to set the variable capacitor.

4. The antenna system of claim 1, wherein the tuning circuitry comprises a variable inductor.

5. The antenna system of claim 1, wherein the tuning circuitry is controlled by software.

6. The antenna system of claim 1, wherein the EEVI comprises a generally circular area with a throat coupling the generally circular area to the geometric perimeter.

7. The antenna system of claim 1, wherein the first antenna comprises a monopole antenna.

8. The antenna system of claim 1, wherein the first antenna comprises a dipole.

9. The antenna system of claim 1, wherein the conductive plane comprises a copper plate mounted on a printed circuit board (PCB) material.

10. The antenna system of claim 1, further comprising:
- a second EEVI positioned exteriorly of the second antenna on the second side of the EEVI; and
- a third antenna positioned exteriorly of the second EEVI on the second side of the EEVI.

11. The antenna system of claim 1 incorporated into a light bulb.

12. The antenna system of claim 1 incorporated into a shelf label.

13. The antenna system of claim 1, wherein the EEVI comprises a generally rectilinear shape.

14. The antenna system of claim 1, further comprising transceiver circuitry coupled to the first antenna and the second antenna by respective ports.

15. The antenna system of claim 1, wherein the feedback tuner circuit is configured to use a received signal strength indicator (RSSI) from the second antenna to determine the signal for the tuning circuitry.

16. The antenna system of claim 15, wherein the RSSI from the second antenna is generated based on a known signal from the first antenna.

17. The antenna system of claim 1, wherein the feedback tuner circuit is configured to provide greatest isolation at or above a transmission frequency.

18. The antenna system of claim 1, wherein the EEVI comprises the tuning circuitry that is coupled to the feedback tuner circuit.

19. The antenna system of claim 1, wherein the tuning circuitry is comprised within the EEVI.

20. The antenna system of claim 1, wherein the tuning circuitry comprises a variable capacitor and an inductor, and the feedback tuner circuit is configured to adjust the variable capacitor.

* * * * *